United States Patent [19]

Wolff

[11] Patent Number: 4,733,589

[45] Date of Patent: Mar. 29, 1988

[54] FOOD SLICER

[75] Inventor: Martin J. Wolff, North Providence, R.I.

[73] Assignee: Dart Industries Inc., Deerfield, Ill.

[21] Appl. No.: 887,409

[22] Filed: Jul. 17, 1986

[51] Int. Cl.[4] .......................... B02C 11/04; B26D 1/02
[52] U.S. Cl. .................................. 83/858; 30/279 R; 30/280; 30/283
[58] Field of Search ................. 30/278, 279 A, 279 R, 30/280, 283; 83/856, 858

[56] References Cited

U.S. PATENT DOCUMENTS 4,038,892  8/1977  Popeil .................................. 83/858
4,212,431  7/1980  Doyel .................................. 83/858

Primary Examiner—Frank T. Yost
Assistant Examiner—Scott A. Smith
Attorney, Agent, or Firm—Russell L. McIlwain

[57] ABSTRACT

A food slicer mountable within a kitchen work unit support frame and comprising a slicer body with a removable infeed ramp. The slicer body includes aligned upper and lower platforms defining a slot therebetween. The adjacent edge of the upper platform forms the slicing blade. The ramp is positioned in overlying relation to the lower platform and includes opposed end edges of different height which, upon selective alignment below the blade edge of the upper platform, vary the effective height of the slot and the thickness of the slice.

5 Claims, 6 Drawing Figures

FOOD SLICER

BACKGROUND OF THE INVENTION

The invention is concerned with a kitchen work unit, and more particularly a slicer for foodstuffs, primarily garden vegetables and the like.

The basic known slicer, as differentiated from a common kitchen knife, includes a fixed blade with a laterally offset infeed platform aligned with the blade and defining therewith a slot of predetermined height. In use, the foodstuff, for example a cucumber, is slid along the infeed platform toward and through the blade, slicing from the foodstuff a portion or slice of a thickness corresponding to the height of the slot with the slice falling beneath the slicer and the bulk or remainder of the foodstuff continuing over the blade onto an upper surface or receiving platform.

The basic slicer can be hand held and oriented at a convenient working angle as desired. Note for example U.S. Pat. No. 2,101,595 to G. Potstada, issued Dec. 7, 1937.

Slicers and similar implements, as a matter of convenience in both stabilizing the slicer and gathering the slices, have been associated with underlying containers, bowls or the like as will be noted in the following U.S. Pat. Nos.:

2,615,486, Marcus, Oct. 28, 1952
2,741,286, Bittle, Apr. 10, 1956
3,589,421, Locker, June 19, 1971
4,212,431, Doyel, July 15, 1980

A further example of known slicers will be seen in the patent to H. A. V. Johansson, U.S. Pat. No. 3,495,639, issued Feb. 17, 1970, wherein the hand held slicer utilizes a threadedly mounted adjustment screw to adjust the thickness of the slices. While not specifically addressed in the Johansson patent, it would appear that the use of an exposed adjustment screw in a food environment, particularly wherein food is being cut, could give rise to problems of cleanliness.

SUMMARY OF THE INVENTION

The food slicer comprising the present invention, while not specifically limited thereto, is primarily in the nature of a self-contained, surface-mounted insert within the work surface of a container cover. The cover itself is mounted to the container, normally in the nature of a kitchen bowl, through a loose friction fit, and defines a work unit frame for the slicer insert.

The slicer is a two piece assembly, formed of hard plastic, comprising an elongate slicer body with an integrally formed transverse slicer blade, and an infeed ramp seated within the slicer body.

The slicer body, to one side of the transverse blade, includes a ramp-receiving recessed compartment with a planar base defining a slice-discharging slot between the blade and the base. To the opposite side of the blade is a planar upper receiving platform.

The ramp includes an upper surface longitudinally inclined relative to the slicer body and provided with opposed ends of different heights. The ramp is reversibly receivable within the ramp-receiving compartment for a selective positioning of either of the opposed ends thereof immediately adjacent the blade slot and in spaced relation to the blade with the particular relationship between the height of the ramp end and the blade determining the effective height of the slot and the thickness of the slice. Thus, the thickness of the slices can be changed through the simple expedient of reversing the infeed ramp. Positioning lugs will be provided to stabilize the ramp in either of its two adjusted positions. No mechanical adjustment means, such as adjustment screws or the like, are required. The invention also contemplates provision for a further slice thickness achievable by a complete removal of the ramp with the planar base of the ramp compartment comprising the infeed surface, thus in effect achieving the maximum thickness slice.

In order to facilitate removal of the ramp for repositioning, cleaning, or the like, the ramp compartment, at a corner remote from the blade, is provided with an outwardly extending finger recess which, while not interfering with the use of the ramp, does provide a convenient means for engaging the fingers with the edge of the ramp.

The two components of the slicer, containing no movable parts, are easily cleaned and maintained clean.

It is believed other objects and advantages of the invention will become apparent from the following detailed description of the construction and manner of use of the slicer of the invention.

DESCRIPTION OF PREFERRED EMBODIMENT

Figure 1:
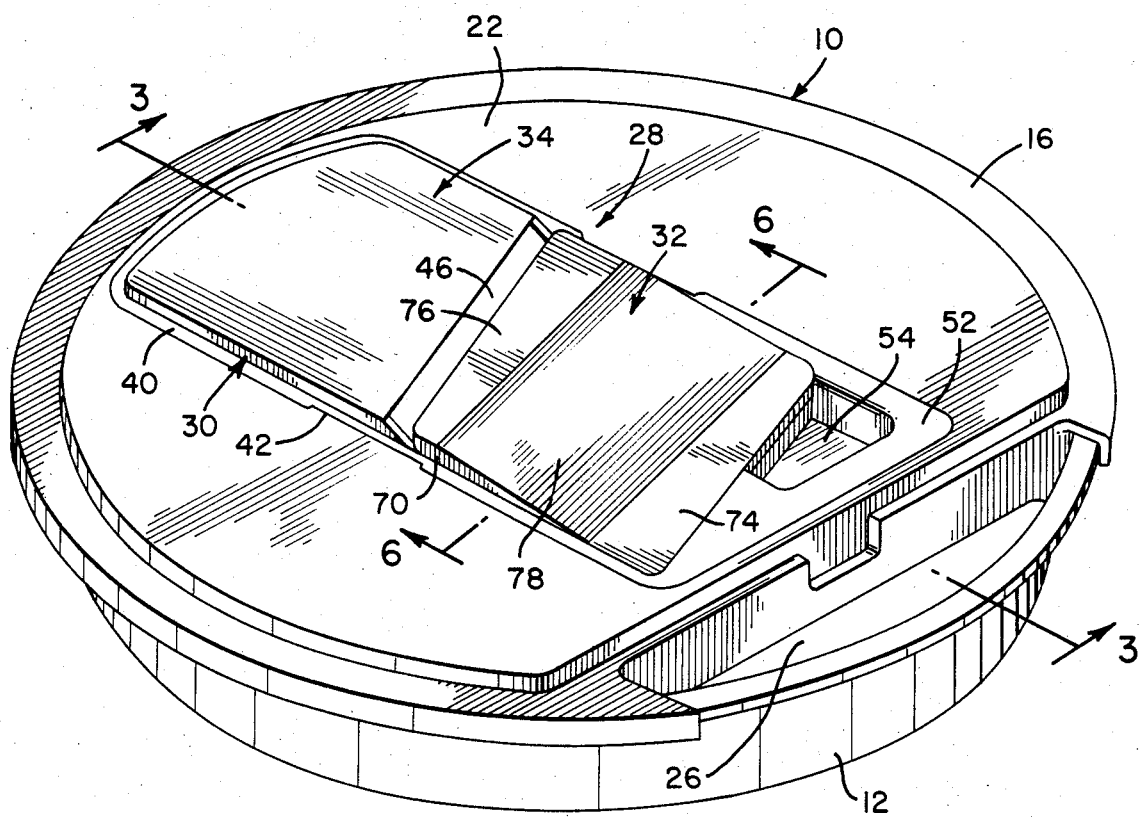
FIG. 1 is a perspective view of the kitchen work unit with the slicer mounted within the cover-forming work unit frame.
Figure 6:
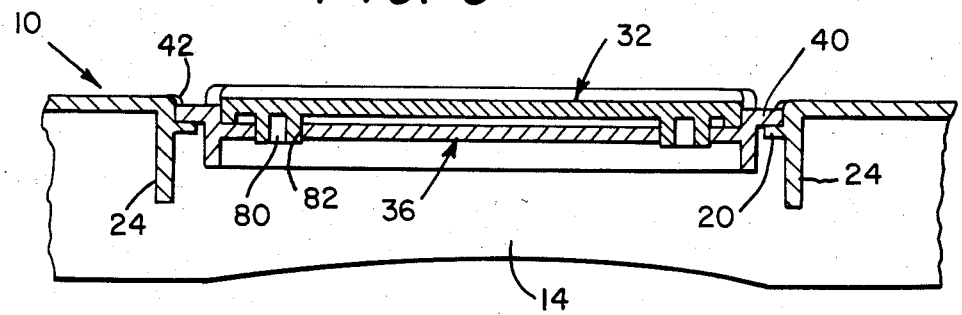
FIG. 6 is a transverse cross-sectional view taken substantially on a plane passing along line 6—6 in FIG. 1.

Referring now more specifically to the invention, reference numeral 10 designates a kitchen work unit frame in the nature of a lid or cover for a bowl 12.

The cover or work unit frame 10 will preferably include a periphery adapted for a snug friction-type engagement with the bowl 12, for example a depending internal skirt 14 telescopically received within the open mouth of the bowl 12 in conjunction with an integral annular flange 16 overlying the bowl rim.

The work unit frame includes an elongate generally rectangular slicer-mounting opening 18 defined by a peripheral seat 20 recessed below the upper surface 22 of the cover 10 and rigidified by depending flanges 24 along the opposed longitudinal sides thereof. As will be noted from the drawings, the mounting opening will preferably extend diagonally from one arcuate end at the periphery of the work unit frame to a second linear end paralleling a segment-shaped port 26 through the cover or work unit frame.

Figure 2:
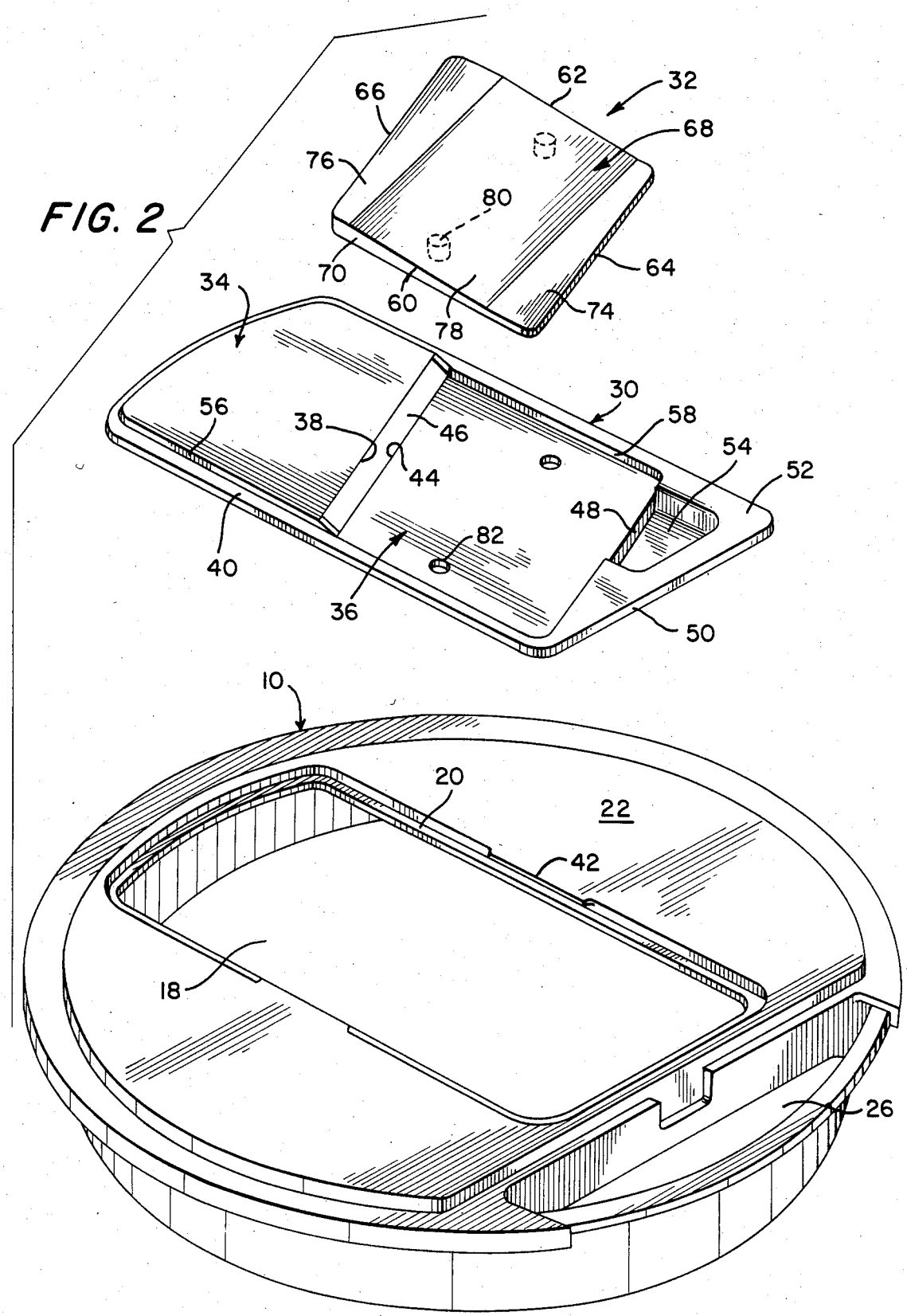
FIG. 2 is an exploded perspective view of the components of the slicer and the work unit frame.
Figure 3:
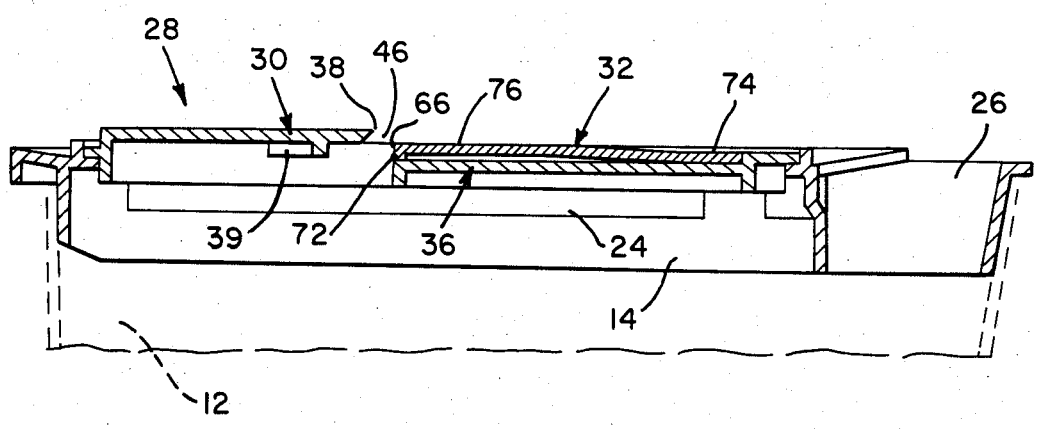
FIG. 3 is a longitudinal cross-sectional view taken substantially on a plane passing along line 3—3 in FIG. 1.
Figure 4:
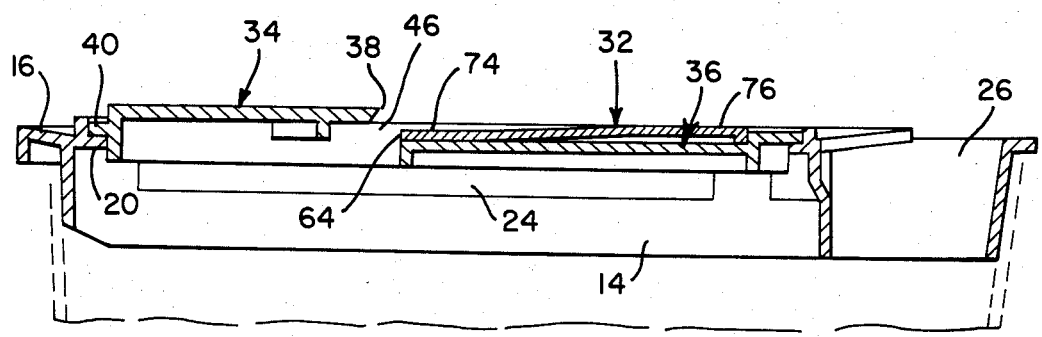
FIG. 4 is a cross-sectional view similar to FIG. 3 with the ramp reversed.
Figure 5:
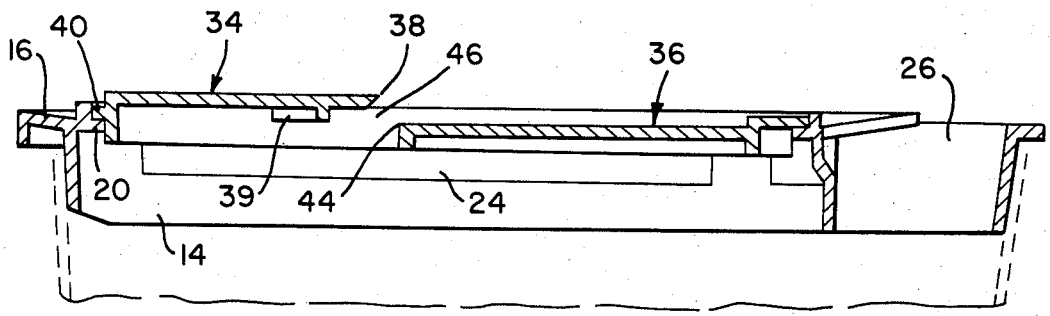
FIG. 5 is a cross-sectional view similar to FIG. 3 with the ramp removed.

The slicer 28 itself comprises two interfitting components, a slicer body 30 and an infeed ramp 32. The slicer body 30 is elongate, generally rectangular, and includes upper and lower parallel planar platforms respectfully defining an upwardly offset receiver platform 34 for receiving the bulk foodstuff from which the slice is cut, and a recessed infeed platform 36 on which the foodstuff is introduced to the slicing element or blade 38. Both platforms are inwardly offset from the periphery of the slicer body 30, defining a peripheral flange 40 which is coextensive with and received on the seat 20 of the mounting opening 18 in the work unit frame 10. Noting FIGS. 1 and 2 in particular, the opening seat 20 can be provided with opposed overlying retaining lips 42 which will snap-engage over the corresponding edge portions of the slicer body,flange 40 a positive retention thereof.

The slicing element or blade 38 is integrally defined along the transversely angled or oblique inner edge of the receiver platform 34. This blade-defining inner edge 38 may be stabilized or rigidified by a rib 39 parallel thereto and depending from the undersurface of the platform 34 in spaced relation thereto. The adjacent inner edge 44 of the lower infeed platform 36 is in parallel spaced generally underlying relation to the blade 38, forming a slice-defining and accommodating slot 46 therebetween. As will be appreciated from FIGS. 1 and 2 in particular, the blade 38 and associated slot 46 are linear, extending generally transversely across the slicer body 30 and angled forwardly along the direction of movement of the foodstuff whereby an appropriate slicing action will be effected upon movement of the foodstuff thereacross.

The outer edge 48 of the recessed infeed platform 36 is of equal length with and extends parallel to the inner edge 44 whereby the recessed infeed platform 36 is in the shape of a parallelogram, or more particularly a rhomboid.

The angled or oblique outer edge 48 of the infeed platform 36 diverges from the adjacent linear outer edge 50 of the slicer body 30 to define a generally triangularly configured handle portion 52. The handle portion 52 is provided with a finger receiving recess or depression 54 communicating with the recessed infeed platform 36 along a section of the outer edge 48 thereof for facilitating the selective positioning and removal of the slicer or infeed ramp 32 as shall be explained subsequently.

The upwardly offset receiver platform 34 is integrally joined to the body-defined seating flange 40 by a vertical connector web or wall 56 depending from the periphery of the receiver platform other than for the inner blade-defining edge 38. Similarly, the infeed platform 36 is integrally connected to the body flange 40 by a depending web or wall 58 peripherally thereabout other than for the slot-defining inner edge 44 thereof and that section of the outer edge 48 communicating with the finger depression 54.

As described, the infeed platform 36 defines a bearing surface for the foodstuff as it is introduced to the slicing blade 38, the height of the slot 46 determining the thickness of the slices. The present invention is particularly concerned with a distinctive means for varying the effective height of the infeed portion at the slot 46, and hence varying the height of the slot and the thickness of the slices. This is achieved by the use of the ramp 32 which is of a basic rhomboidal configuration conforming to the infeed platform 36 and closely receivable within the compartment defined by the recessed platform 36 and the peripheral vertical wall 58.

The ramp 32 has opposed parallel side edges 60 and 62, and opposed end edges 64 and 66, which, while parallel to each other, extend at oblique angles corresponding to the angular extent of the inner and outer edges 44 and 48 of the infeed platform so as to directly overly these edges. The ramp 32 is defined by a panel 68 inclined upward from the lower end edge 64 to the upper end edge 66 whereby the effective height of the slot 46 can vary, relative to the full height thereof defined by the infeed platform 36, in two incremental steps upon selective alignment of the end edges 64 and 66 therewith over the platfrom edge 44.

The actual inclination to the ramp panel 68 is provided by a pair of tapered side flanges or walls 70 which are integrally formed respectively along the opposed side edges 60 and 62. A constant height depending flange or wall 72 is also integrally formed along the uppermost end edge 66 for a rigidification thereof. It is contemplated that the lowermost end edge 64 of the ramp panel 68 be of a height equal to the thickness of the panel 68, and thus not require an additional rigidifying flange thereacross.

In order to provide for a horizontal orientation of the foodstuff, that is an orientation parallel to the plane of the fixed infeed platform 36, as the foodstuff is introduced to the fixed blade 38, it is preferred that the infeed panel 68, and more particularly the upper infeed or working surface thereof, include horizontal end sections 74 and 76 immediately adjacent the end edges 64 and 66 and extending inwardly therefrom. The end section 74 and 76 are in parallel vertically offset planes and are of opposed generally trapezoidal configurations defining a central rectangular continuously inclined ramp surface 78 therebetween.

In order to stabilize the infeed ramp 32 within the recessed compartment over the infeed platform 36, the central section 78 is provided with a pair of depending lugs 80 which are snap-fitted or received within a corresponding pair of sockets or apertures 82 through the infeed platform 36. The positioning of the lugs 80 and apertures 82 is such whereby the infeed ramp 32 is reversible, for a selective aligning of either end edge 64 or 66 with the slot-defining inner edge 44 of the infeed platform 36, the lugs and apertures effectively interlocking in either position of the ramp. As previously indicated, removal of the ramp can be easily effected by access to the outermost end edge through the finger depression 54.

The slicer, including both the slicer body 30 and the infeed ramp 32 are to preferably be formed of hard plastic, the slicing blade itself being integrally formed with the slicer body. The removable and reversible infeed ramp provides a significant degree of adjustability in the slice thickness without requiring mechanical adjustment means or the like.

While particularly intended for use as an insert in a work unit frame such as the bowl cover or lid 10, the slicer is a self-contained unit which can be used independently of the frame. This is particularly the case in light of the manner in which the infeed ramp can be releasbly fixed in position by the locking lugs 80, in either of its adjusted positions. In addition, the relatively wider handle portion 52 with the finger depression 54 provides for a convenient means for the holding and manipulation of the slicer body.

I claim:

1. A food slicer comprising a slicer body and an infeed ramp, said slicer body including a pair of longitudinally aligned platforms, said platforms comprising an upper receiving platform and a lower infeed platform, said platforms having adjacent inner edges at a spacing defining a slot of predetermined height therebetween, a slicer blade along the inner edge of said upper platform, said infeed ramp being removably receivable on said lower platform and including an upper working surface and plural spaced edges selectively alignable with and over the slot-defining inner edge of said lower platform to reduce the effective height of the slot, said ramp edges comprising a pair of parallel opposed edges of different heights whereby the height of the slot will vary in accord with the ramp edge aligned over the inner edge of the lower platform, said working surface including a planar section at and inward of each edge of said parallel edges, each of said planar sections lying in a plane disposed generally parallel to the plane of said infeed platform and being of equal height with the corresponding edge, and said working surface further including an inclined section between and connecting said planar sections.

2. The food slicer of claim 1 including means for releasably fixing said ramp to said lower platform in any of a plurality of adjusted positions with one of said ramp edges aligned over the inner edge of the lower platform.

3. The food slicer of claim 2 wherein said means for selectively fixing said ramp to said lower platform comprises apertures defined in said infeed platform and depending lugs on said infeed ramp releasably engageable in said apertures.

4. The food slicer of claim 3, wherein said lugs are centrally located and equidistant from the different height ramp edges, said infeed platform including an outer edge parallel to the inner edge thereof, said apertures being centrally located relative between the inner and outer edges of the infeed platform.

5. The food slicer of claim 4 wherein the slicer body, outward of the outer edge of said infeed platform, includes a handle portion upwardly offset from said infeed ramp, and a finger depression in said handle portion adjacent said outer edge, said depression depending below the infeed platform for direct finger access to the infeed ramp received thereon.

* * * * *